United States Patent [19]
Paton et al.

[11] 3,894,573
[45] July 15, 1975

[54] INSTALLATION AND METHOD FOR PLASMA ARC REMELTING OF METAL

[76] Inventors: Boris Evgenievich Paton, Kotsjubiuskogo, 11/13, kv. 21; Victor Iosifovich Lakomsky, Bastionoja, ul. 10; Anatoli Ivanovich Chvertko, Blvd. Lesiga, Ukrainka 2; Grigori Bogratovich Asovants, Blvd. Lesiga, Ukrainka 2; Oleg Semenovich Zabarilo, c/o Paton Welding Institute 69 ul. Gorkogo, all of Kiev, U.S.S.R.

[22] Filed: June 5, 1972

[21] Appl. No.: 259,690

[52] U.S. Cl. ............... 164/52; 164/252; 219/121 P
[51] Int. Cl. ...................... B22d 27/02; B22d 11/10
[58] Field of Search ............ 219/121 P; 164/52, 82, 164/252, 281

[56] References Cited
UNITED STATES PATENTS

| | | | |
|---|---|---|---|
| 2,762,093 | 9/1956 | Hood | 164/82 X |
| 3,237,254 | 3/1966 | Hanks et al. | 164/50 |
| 3,312,566 | 4/1967 | Winzler et al. | 219/121 P X |
| 3,344,839 | 10/1967 | Sunnen | 164/52 |
| 3,496,280 | 2/1970 | Dukelow et al. | 219/121 P X |
| 3,625,660 | 12/1971 | Reed et al. | 219/121 P X |
| 3,683,997 | 8/1972 | Uziie et al. | 164/85 X |

FOREIGN PATENTS OR APPLICATIONS

| | | | |
|---|---|---|---|
| 1,323,043 | 2/1963 | France | 164/281 |
| 189,669 | 1/1967 | U.S.S.R. | 219/121 P |
| 1,237,115 | 6/1971 | United Kingdom | 164/50 |

*Primary Examiner*—R. Spencer Annear
*Attorney, Agent, or Firm*—Strauch, Nolan, Neale, Nies & Kurz

[57] ABSTRACT

Improvements in apparatus for and the method of plasma arc remelting of a metal charge are disclosed and claimed. A plurality of plasma torch means are adjustably mounted in a plasma remelting chamber. These torches may be adjusted in order to change the position of the plasma arcs with respect to each other and to the mold contained in the chamber. The metal charge to be melted can be in the form of a metal blank which is moved axially into the plasma arcs for melting and which is rotated with respect to the plasma arcs during melting. From two to six adjustable torch means are employed for use within the plasma chamber.

37 Claims, 12 Drawing Figures

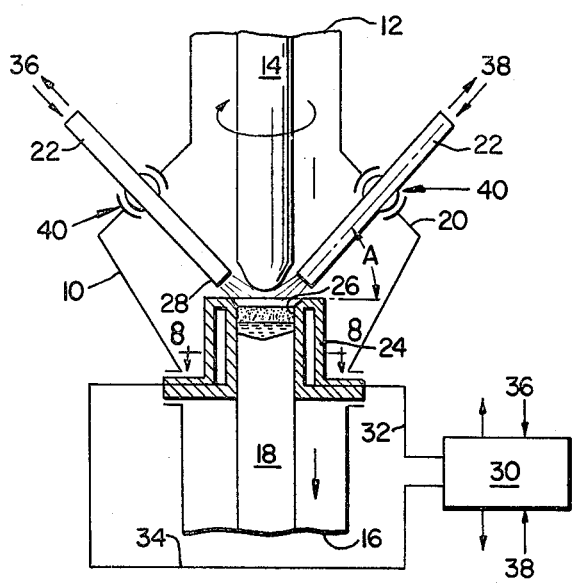
FIG. 1
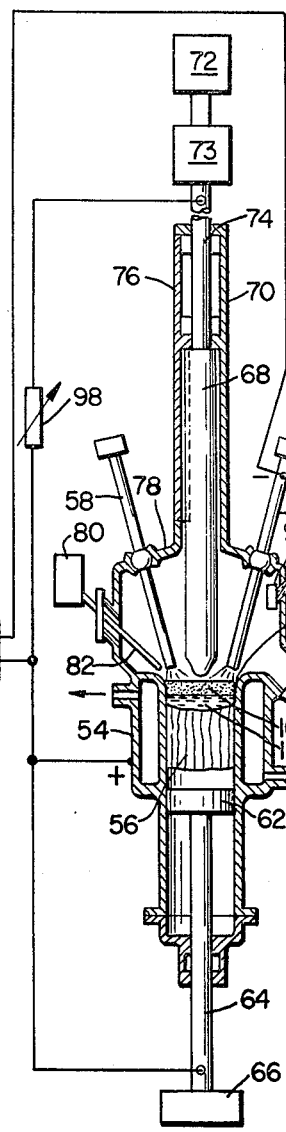
FIG. 2
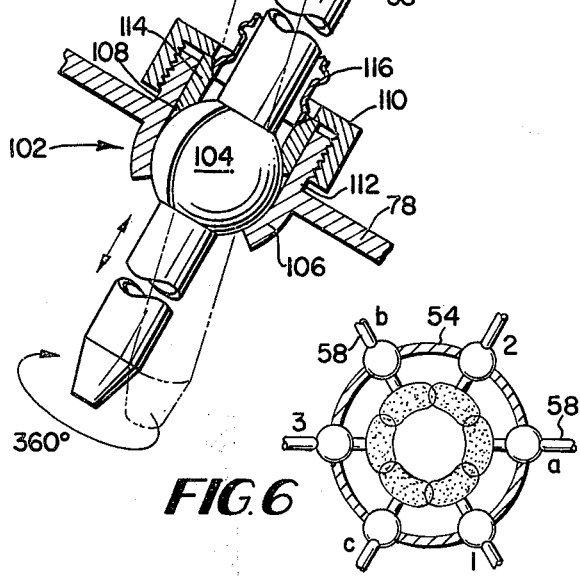
FIG. 4
FIG. 6
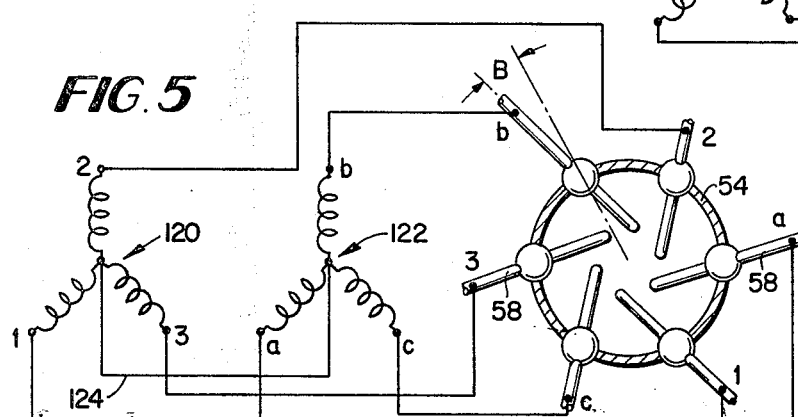
FIG. 5
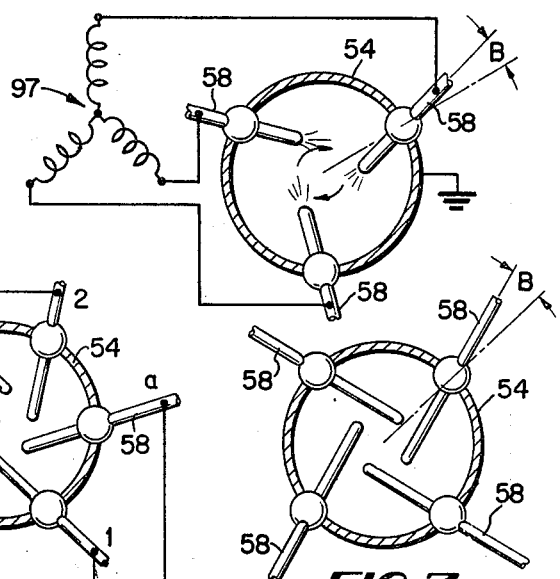
FIG. 3

INSTALLATION AND METHOD FOR PLASMA ARC REMELTING OF METAL

BACKGROUND OF THE INVENTION

The present invention relates to improved apparatus for the formation of metal ingots by the plasma arc remelting process and to new methods for the operation thereof.

Known installations for the production of ingots in plasma arc remelting comprise a mold with a movable bottom positioned within a hermetically sealed chamber and one or several plasma torches connected to a source of electrical energy. The formed ingot is extracted from the mold by a suitable withdrawing mechanism.

A known installation of this type is disclosed in British Pat. No. 1,237,115 based, in part, on the work of the applicants hereof. In that installation several plasma torches having a fixed position with respect to the mold were provided for melting a metal blank which was lowered into the remelting chamber. Difficulties with the thermal balance in this installation were encountered and overcome. A principal problem encountered in the operation of the installation described in the British Pat. No. 1,237,115 was that the plasma arcs frequently burned through the water cooled mold, thereby releasing the coolant fluid into the evacuated space of the chamber and causing serious explosions due to the presence of high temperature molten metal therein. Another problem was that the plasma arcs did not occupy the same paths between the plasma torches and the mold in successive runs, thus the metal blank was not uniformly melted in this apparatus.

These disadvantages were overcome by development of the present improved installation and method of plasma arc remelting wherein at least one of the plasma arc torches is adjustably mounted in the chamber so that the position of the plasma arc therefrom can be adjusted with respect to the mold and wherein the metal blank being melted can be rotated as well as lowered axially into the remelting zone within the chamber.

SUMMARY OF THE INVENTION

The present invention consists of an installation for the production of metal ingots including a hermetically sealable chamber which contains an ingot forming mold and which has mounted therein a plurality of plasma arc torch means. At least one of the torch means is adjustably mounted within the chamber to enable movement of the plasma arc therefrom with respect to the other torches and with respect to the mold. Also provided are an electric power supply source for powering the torch means and a metal charge arranged within the chamber to be melted in the plasma arc and the molten metal therefrom solidified in a mold to form an ingot. The plasma arc torch means are adjustable for movement along the axis thereof and for variable axial positioning about a fixed given point on their axes in a ball joint-type movement.

Also provided is a mechanism for rotating the metal blank being melted simultaneously or selectively with respect to movement of the blank in the direction of its axis. When the metal charge being melted is in the form of metal particles, no metal blank feeding mechanism is needed.

An object of the present invention is to provide a plasma arc remelting installation wherein the plurality of plasma arc torch means are radially arranged about the axis of the mold within the chamber in order to direct their plasma arcs in a direction at an acute angle to the vertical axis of the mold.

Another object of the present invention is to position the metal blank to be melted coaxially with and above the mold.

Yet another object of the present invention is to position the torch means within the chamber in order to direct the plasma arcs therefrom in a direction having at least a tangential component so as to cause horizontal rotary motion in the molten metal in the mold.

Another object of the present invention is to provide a plasma arc remelting installation and method for producing ingots of various sizes and cross-sectional shapes such as circular, hollow, rectangular, square, polyhedral, and nonrectinlinear shapes such as crosses and other irregular shapes. These various shapes can be produced in subject plasma arc remelting installation due to the adjustable feature of the plasma arc torches and the use of from 2 to 6 torches positioned within the chamber.

Another object of the present invention is to provide a method for plasma arc remelting involving the steps of suspending a metal blank within the hermetically sealable chamber from a blank feeding mechanism, removing the air in the chamber to create a vacuum in the order of $10^{-2}$mmHg, scavaging the chamber with an inert gas, supplying electric power to the plurality of plasma arc torch means positioned above the mold in the chamber, melting liquid metal from the metal blank and solidifying the melted metal in the mold, feeding the metal blank axially downwardly as it is melted by the plasma arcs, and simultaneously extracting from the mold the formed ingot while maintaining the liquid level at a constant position within the mold.

DESCRIPTION OF THE DRAWINGS

The nature of the present invention will further become more fully apparent from a consideration of the following description of an exemplary embodiment thereof, taken in conjunction with the accompanying drawings, in which:

FIG. 1 is a schematic front elevation diagram of the apparatus of the present invention;

FIG. 2 is a front elevation diagrammatic sketch of the complete plasma arc remelting installation showing the supporting systems;

FIG. 3 is a plan schematic view of the positioning of the plasma arc torches in the installation of FIG. 2 and includes a schematic 3 phase AC power circuit;

FIG. 4 is a detailed drawing of the arrangement for adjusting the position of a plasma arc torch;

FIG. 5 is a schematic diagram of six plasma arc torches arranged according to subject invention shown in top view with respect to the mold and includes a schematic power circuit using two 3 phase AC sources;

FIG. 6 is a diagrammatic plan view of a six torch furnace with the torches in radial disposition and illustrates the slightly overlapped sector relationship of the individual plasma arc zones which provide remelting; and FIG. 7 is a schematic diagram of four plasma arc torches according to the present invention shown in top view.

Referring now to FIG. 1, a schematic diagram of the plasma are remelting installation is shown with a hermetically sealable chamber 10 having an opening 12 at the top portion thereof for accommodating a vertically positioned metal blank 14 and an opening 16 in the lower portion thereof for accommodating a solidified ingot 18. Also provided is a downwardly inclined roof portion 20 which accommodates a plurality of plasma torch means 22 which extend therethrough into the vicinity of the lower end portion of the metal blank 14. A fluid cooled mold 24 is positioned with its upper mouth 26 closely spaced to the plasma arc ends 28 of the plasma arc torches 22. A coolant system 30 is provided for supplying cooling fluid through coolant lines 32 and 34 to the mold 24 and also for providing cooling fluid for plasma arc torches 22 through dual lines 36 and 38 (shown unconnected). Cooling system 30 may also be connected with chamber 10 to provide cooling in sidewalls thereof.

Figure 8:
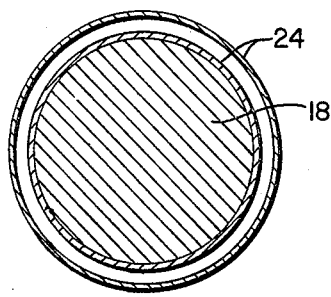
FIG. 8 is a schematic cross-section taken on line 8—8 of FIG. 1 and illustrates a mold and ingot of circular cross-section.
Figure 9:
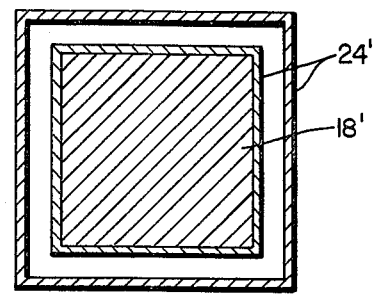
FIGS. 9, 10 and 11 are schematic cross-sections, such as shown in FIG. 8, and respectively illustrate alternate molds and ingots of (1) rectangular or square cross-section, (2) non-rectangular of polyhedral cross-section, and (3) non-rectangular, e.g., cross-shaped cross-section.

The operation of the plasma arc remelting installation of FIG. 1 is as follows. Plasma arc torches 22 are connected with a conventional source of electrical power (not shown) which is connected directly to the ingot 18 and mold 24. The metal blank 14 to be melted is then suspended within the upper portion of the chamber 12 in substantially the position shown in the schematic diagram of FIG. 1. The air within the chamber is then exhausted to a vacuum in the order of $10^{-2}$ mmHg and the chamber is scavaged with an inert gas such as argon. The plasma arc torches are then sequentially ignited by the use of a direct current pulse put therethrough with the power supply source. A convenient method of establishing this initiating DC pulse is to employ a common oscillator connected between the torch means to be started and the mold 24. Once the plurality of torch means have been started the metal in blank 14 is progressively melted and drops into mold 24 and forms a molten metal bath on top of ingot 18. Metal blank 14 is then progressively lowered as it is melted off and ingot 18 is progressively extracted from the bottom portion of chamber 16 as the molten metal pool progressively solidifies by reason of the heat extracted by fluid cooled mold 24. Metal blank 14 is axially lowered into the remelting zone defined by the plasma arcs issuing from the plasma arc torches 22. It can also be rotated as shown by the rotation arrow as it is lowered into the remelting zone. By carefully controlling the remelting parameters and adjusting the positions of the plasma arc torches 22 with respect to the melting end of metal blank 14, the liquid level of the molten metal pool in the top of mold 24 can be maintained at a constant position within the mold to attain balanced thermodynamic conditions within the remelting zone and the molten metal bath and to produce a high quality metal ingot which is substantially free from nonmetallic inclusions, stringers, and gas bubbles. The grain pattern shown by the ingots thus produced is of the ideal herringbone formation wherein the grain patterns are directed from the center of the ingot upwardly and outwardly toward the exterior surfaces thereof.

The axial moving of metal blank 14 and the rotation thereof can be selectively used when needed, and particularly rotation of the ingot need not be used in all cases since the plasma arc torches are adjustably mounted within chamber 10.

In the schematic diagram of FIG. 1, the plasma arc torches are positioned within chamber 10 in such a manner that their longitudinal axes define an angle A with a plane defined by the horizontal top of mold 24. This angle can be varied by virture of the adjustable feature of the plasma arc torches by reason of ball joints 40 which are formed in the roof portion 20 of the plasma arc remelting installation. The position of the ball joints with respect to the plasma arc torches 22 define a fixed point along the axis about which variable axial positioning is possible. It is also possible to adjust the longitudinal axial position of the torches 22 by moving them inwardly and outwardly along their axis in order to bring the plasma arc torches closer to and further away from the mouth portion 26 of mold 24. This adjustable feature of the plasma arc torches allows a single plasma arc installation as described herein to produce a variety of cross sections of ingots 18, 18', 18'' and 18''' by inserting into chamber 10 different molds 24, 24', 24'' and 24'''(see FIGS. 8-11). For example, a circular cross section mold 24 can be removed and replaced with a square or rectangular cross section mold 24', or a polyhedral cross-section mold 24'', or a cross-shaped cross-section mold 24''', etc., and the plasma arcs adjusted as needed to accommodate the different size and shaped ingots 18', 18'' or 18''' respectively. As shown the mold 24 is removable retained within chamber 20.

The schematic diagrams of FIGS. 2 and 3 show a plasma arc installation 50 which is fully equipped with the operational supporting subsystems therefor. The hermetically sealable chamber 52 is provided with a fluid cooled mold 54 which is shown integrally constructed wth respect to the remaining portions of chamber 52 and is arranged to form an ingot 56. A plurality of plasma arc torches 58 are positioned so as to direct the plasma arcs toward the upper mouth portion 60 of mold 54. The plasma arc torches are adjustably mounted and in the position shown have their axes in vertical planes which are directed at acute angles to the vertical axis of the mold 2. These adjustable torches can either extend in a vertical diametric plane of the mold or they can be adjusted to have a direction having a component extending tangentially to rotate the bath of molten metal in the mold 2 by means of the plasma arcs issuing from the torches. An arrangement of the torches 58 having a tangential component is shown in FIG. 3.

The mold 54 has a movable bottom or carriage 62 which is connected via rod 64 to an ingot extracting mechanism 66.

Figure 12:
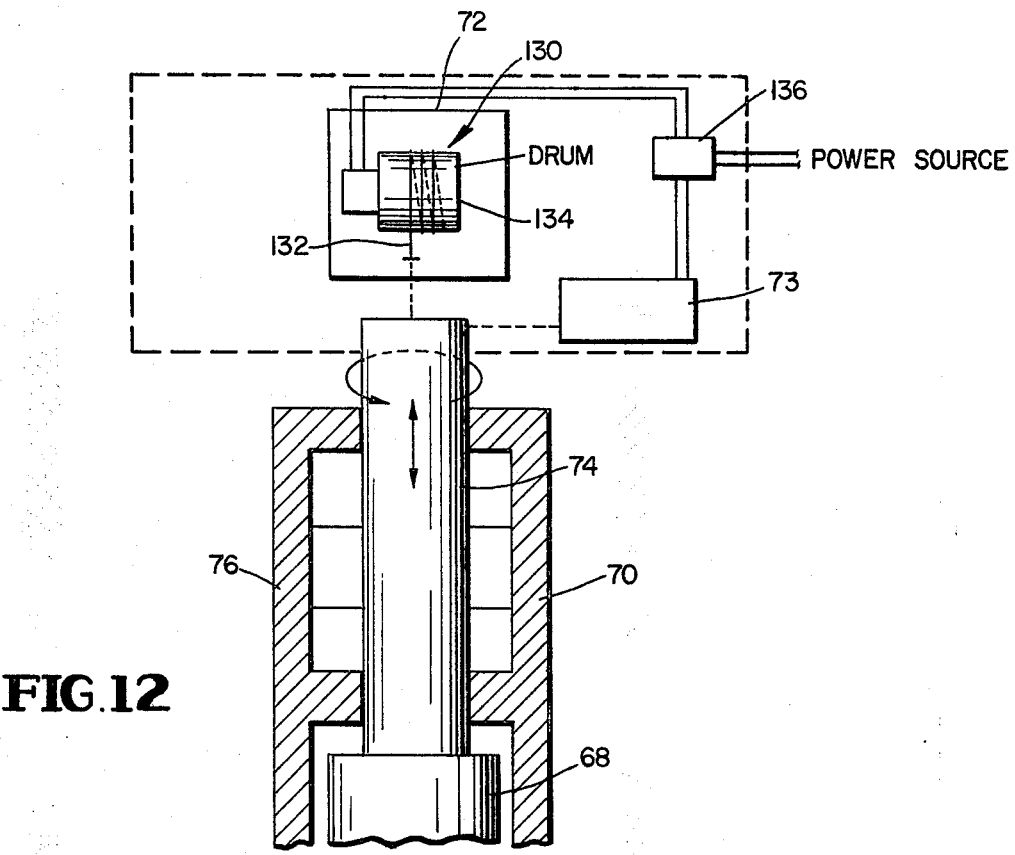
FIG. 12 is a schematic representation of a blank feeding and blank rotating mechanism.

Metal blank 68, as shown schematically in FIGS. 2 and 12, is supported within upper neck portion 70 of chamber 52 by a blank feeding mechanism 72 via connector means 74. A further power driven mechanism 73 operates on the blank connector means to rotate or oscillate the blank during remelting. A side hatch 76 is provided in upper neck portion 70 in order to provide for insertion of the metal blank 68 and for withdrawing of the spent stub of the blank following the melting operation.

Plasma arc torches 58 are positioned within an upper roof portion 78 of chamber 52 and are adjustably mounted therein in the same fashion as described in FIG. 1 above. In order to melt a metal charge in installation 50 it is not necessary to employ a solid metal blank 68. It is also possible to add the charge by way of feeding metal particles such as scrap into the upper mold mouth 60 via a hopper 80 connected with the interior of the chamber through a feed trough 82.

Vacuum pump 84 is connected via pipe line 86 with chamber 52 which, along with plasma arc torches 58, is supplied with plasma forming gas or gas mixtures from gas tank 88 connected to each plasma arc torch through a gas distribution device 90 which is designed to simultaneously control the gas consumption as well as the ratio of gases in the plasma gas mixture.

To assure constant pressure in chamber 52 during the melting cycle, provision is made for a gas recirculating circuit comprising a diaphragm compressor 92 connected to distribution device 90 and through a system of gas filters 94 which also contain a chemical purification system containing adsorber devices to pipe line 86.

The plasma arc remelting installation can be supplied with DC or AC power supply via electric supply source and control unit 96. The plasma arc torches 58 are connected to the negative terminal of the supply source 96 while the mold 54 is connected to the positive terminal, in DC mode. In the latter case the mold 54 may be connected to the positive terminal directly or through the ingot withdrawing mechanism 66.

The electrical power source portion of unit 96 can be a 3 phase alternating transformer having its secondary windings arranged in star form 97 (FIG. 3) with each leg connected to a respective plasma-arc torch 58 and the star neutral point or center connector insulated from ground and from the mold 54. The mold 54 can be and in the normal installation usually is grounded.

When melting a high-melting point metal blank 68, the blank should be preliminarily heated by means of connecting it to the positive terminal of the current supply source 96 through current regulator 98.

Installation 50 is provided with a viewing port 99 located in the sidewall of chamber 52 in order to allow viewing of the position of the arcs during the melting process for making positional adjustments of the torches 58 to assure optimum results. A cleaner mechanism 99', and per se conventional, can be provided in order to remove the condensed slag and impurity vapors from the inner side of the viewing port 99.

In operation installation 50 provides for the same method steps of operation as does the schematic diagram apparatus described in FIG. 1 with the addition that the various steps described in the description of FIG. 1 are carried out specifically by the additional supporting subsystems set out above. Namely, first the metal blank 68 is inserted into the upper neck portion 70 through side access port 76. The air in chamber 52 is then pumped out by vacuum pump 84 until a satisfactory low pressure is reached such as $10^{-2}$ mmHg. The chamber 52 is then filled and scavaged with a neutral gas which is then recirculated with the gas recirculation equipment 90, 92 and 94. Plasma arc torches 58 are then initiated in a manner described above and the positions thereof are adjusted in order to accommodate the particular type of cross-section of the ingot 56 being solidified within installation 50. When a molten metal bath is obtained in the upper part of mold 54 as the result of melting of the lower end portion of metal blank 68, the metal blank feeding mechanism 72 and the ingot extracting mechanism 66 are initiated.

The removal of nonmetal and gaseous admixtures in the molten metal bath, as well as the change of shape of the end of the metal blank 68 as a result of the fusion action and control over the drip forming process on the lower end of the metal blank can be conveniently varied within the installation 50 by adjustment of the axial positions thereof as above described without the necessity of replacing and rebuilding the entire installation 50 for each new position of the torches which is desired.

When the plasma torches 58 are positioned with a tangential component as described above with reference to FIG. 3, the molten metal bath under the action of the plasma arcs will rotate and speed of rotation can be regulated by varying the angle B (see FIG. 3) which the plasma torches form with the radial planes passing through the axis of the mold 54. Also, the force of the plasma arcs can be additionally controlled by varying the volume of the inert gas being pumped through the torches and also by varying the current applied to the torches.

The forming of molten metal drops on the lowermost end of metal blank 68 can be additionally regulated by varying the current being supplied by electric power supply means 96 by employing modulated pulses of current having an optimal pulse shape and duration. Pulsing of the gas being delivered from the torches can also be employed.

If during the melting process a molten slag cover 100 for the molten metal bath is required for refining of the metal, slag can be added through trough 82 as desired during the process.

Figure 10:
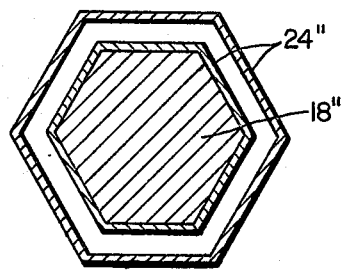
Figure 11:
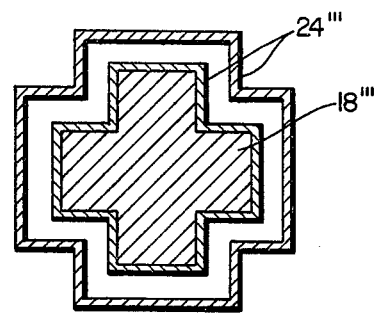

The mold 54 may be shaped to produce ingots of a variety of cross-sectional shapes such as circular (see FIG. 3), rectangular or square (see FIG. 9), nonrectangular (see FIGS. 10 and 11), e.g.; polyhedral (FIG. 10). The mold is designed to extract up to 80% of the heat released by the solidifying ingot through the cooling system therefor.

The molten metal pool 101 supported by the solidified ingot 56 forms a flat shallow bath in the installation 50 which has a maximum depth dimension to maximum cross-sectional dimension (diameter for FIG. 3) of the mold of from 1/5 to 1/10. Within this molten metal bath the temperature gradient can be up to about 200°C per centimeter by employing currents of from 500 to 5000 amps. and voltages of from 40 to 200 volts. The operation power level of the installation 50 is from 150 to 3,000 kilowatts in order to produce ingots having weights varying from 50 kg. to 5,000 kg.

As described briefly above, the power drive mechanism 73 is adapted to selectively rotate and/or oscillate the blank about its vertical axis with respect to the plasma ards and the blank feed mechanism 72 is provided to move the blank in the direction of its axis. Since the two movements are selective, the blank can be either independently or simultaneously moved in the direction of its axis and rotated or oscillated about its axis by mechanisms 72 and 73. As shown in FIG. 2, feeding mechanism 72 is connected to metal blank 68 via connection means 76 shown as a connecting rod.

The connection means 74 can be constructed for operation by a cable hoist device 130 (see FIG. 12) for lowering the blank along its axis while still retaining selective rotation of the metal blank 68 or oscillation by mechanism 73. In this case the cables 132 can be wound around a drum 134 which is positioned within the mechanism 72 and the blank turning or oscillating means can be a device such as a reversible hydraulic cylinder employed with suitable linkage for rotating the blank connector in order to selectively rotate the blank in the same or opposite directions with respect to the plasma arcs. Alternatively, the mechanism 72 can contain an electric motor driven gear train including spur gears, worm gears, and a speed control magnetic amplifier in order to rotate the blank with respect to the plasma arc.

Installation 50 can also be provided with a remote control system which is physically removed from chamber 52 for controlling the electric power supply source, the feeding mechanism and the ingot extracting mechanism as well as all other supporting subsystems.

Referring now to FIG. 4, a detailed schematic view of a plasma torch 58 is shown in which the torch extends through the upper roof portion 78 of the hermetically sealable chamber and is connected with gas line 90 and to electric power supply source 96. A ball joint arrangement 102 is shown in which a split ball 104 surrounds tubular torch 58. The ball joint provides a universal mounting which enables the torch to be rocked about the center point of the ball joint to desired angular positions. Ball 104 rests in a socket 106 formed integrally with the roof portion 78 at the inner end of opening 108. Split ball 104 can be tightened around torch 58 by reason of the tightening of adjustment nut 110 about threaded neck 112 which extends upwardly from opening 108. Adjustment nut 110 transmits the screw force thereof through internal flange sleeve 114 onto the top surface of split ball 104. Sealed flexible sleeve 116 is secured to the external surface of torch 58 and to the inner surface of flange sleeve 114 in order to hermetically seal the adjustment ball and socket joint 102. Other conventional seals may be employed as desired.

By release of the force exerted on nut 110 on internal flange sleeve 114 the locking force of split ball 104 is released from gripping action about torch 58 so that the torch may be moved axially inwardly and outwardly of opening 108 or can be moved to a variety of axial positions about the fixed point on its axis defined by the position of split ball 104. Thus, an adjustable and hermetically sealable plasma arc torch 58 is provided for use in plasma arc remelting installations.

Referring now to FIGS. 5 and 6, an arrangement of 6 plasma arc torches is shown in schematic relationship to a circular mold 54 with an alternating current power supply. A unit with 9 plasma arc torches can be constructed in a manner similar to that shown for FIGS. 5 and 6 by adding 3 torches and utilizing an additional 3 phase secondary having a star form winding. Angle B is presented between the axis of the torches and radial planes passing through the axis of the mold. Angle B, when greater than zero, provides a tangential component to the plasma arc issuing from the tip of torches 58 in order to provide the rotational action in the molten metal bath described above. The greater the angle B the greater the tangential force exerted on the slag bath 100 or the metal pool 101.

FIG. 5 shows the use of two 3 phase secondary star form windings 120 and 122 which can be associated with the same 3 phase primary. Each of the six windings is connected to an associated one of the six plasma arc torches 58. The connecting sequence of the winding connections of the star form secondaries 120 and 122 is set forth by the numbering and lettering shown in drawing FIG. 5. As shown, the neutral or center connection of the two star secondary forms can, if desired, be connected as shown at 124. In any event, the center points are insulated from ground. Angle B in FIG. 5 may be zero, in which case the six torches will be radially positioned as shown in FIG. 6 and will not exert a tangential force component on slag bath 100 and molten bath 101.

FIG. 6 shows the sector shaped overlapping arc plasma zones formed by each of the torches 58 which have been numbered and lettered to correlate with the AC power connections shown in FIG. 5. These overlapping arc plasma zones provide a more even heating action within the furnace remelting zone and provide a ring heating effect to better melt the blank and accomplish a desired shallow metal pool zone. Utilizing this electrical supply arrangement, the plasma arcs of each of the plasma torches are stabilized. The plasma arcs scan over the slightly sector shaped and slightly overlapped zones as depicted in FIG. 6.

The plasma arc remelting installations described herein can be used to melt high quality nitrogen-containing steels, noble metals, titanium, as well as steels and alloys with considerable contents of manganese and other easily volatilizing elements. Precision and heat resisting alloys, special ball-bearing steels and construction steels can also be advantageously remelted in the plasma arc remelting installation described herein.

The radial arrangement of the plurality of plasma arc torches around the mold allows for even placement of the plasma arcs and a precise regulation of the heating of all sections of the molten metal bath by changing the relative positioning of the torches with respect to one another and with respect to both the metal blank and the mold.

The inert gas used in the chamber can be argon, nitrogen, or mixtures of argon with hydrogen or with nitrogen.

The invention may be embodied in other specific forms without departing from the scope, spirit, or essential characteristics thereof. The present embodiments are, therefore, to be considered in all respects as illustrative and not restrictive, the scope and spirit of the invention being indicated by the appended claims rather than the foregoing description, and all changes which come within the meaning and range of equivalency of the claims are therefore intended to be embraced therein.

What is claimed and desired to be secured by Letters Patent is:

1. A plasma arc remelting installation for producing ingots comprising a hermetically sealable chamber; an ingot-forming mold contained in said chamber; a plurality of plasma arc torch means carried by said chamber and positioned above said mold, and means mounting at least one of said plasma arc torch means in said chamber for adjustable positioning of the torch means along its axis and for selective universally rockable positioning about a given fixed point on its axis to enable movement of the plasma arc therefrom during remelting with respect to said mold; an electric power supply source, said torch means connectable to so as to supply plasma to melt metal; and a metal charge arranged to be melted in the plasma arcs and the molten metal therefrom solidified in said mold to form an ingot.

2. A plasma arc remelting installation as defined by claim 1 wherein said plurality of plasma arc torch means is arranged about the axis of said mold and positioned within said chamber to direct their plasma arcs in a direction at an acute angle to the axis of the mold.

3. A plasma arc remelting installation as defined by claim 1 wherein said mold is connectable to said electric power supply source.

4. A plasma arc remelting installation as defined by claim 1 wherein said metal charge comprises a metal blank, and wherein said blank is positioned coaxially with and above said mold.

5. A plasma arc remelting installation as defined by claim 1 wherein said metal charge comprises metal particles released within said chamber from a hopper.

6. A plasma arc remelting installation as defined by claim 1 wherein said adjustably mounted torch means includes means enabling positioning to direct its plasma in a direction having at least a tangential component so as to cause horizontal rotary motion in the molten metal in said mold.

7. A plasma arc remelting installation as defined by claim 1 wherein a coolant system is provided for said mold and said plurality of plasma arc torch means.

8. A plasma arc remelting installation as defined by claim 7 wherein up to about 80% of the heat released by the solidifying ingot is removed by said mold.

9. A plasma arc remelting installation as defined by claim 1 wherein said mold forms an ingot of circular cross-section.

10. A plasma arc remelting installation as defined by claim 1 wherein said mold forms an ingot of rectangular or square cross-section.

11. A plasma arc remelting installation as defined by claim 1 wherein said mold forms an ingot of nonrectilinear or polyhedral cross-section.

12. A plasma arc remelting installation as defined by claim 1 wherein the number of plasma arc torch means positioned above said mold is between the numbers of 2 to 9.

13. A plasma arc remelting installation as defined by claim 1 wherein said electric power supply source comprises one or more three phase alternating current transformers having secondary coils arranged in a star winding.

14. A plasma arc remelting installation as defined by claim 13 wherein the neutral points of said transformers are insulated from ground.

15. A plasma arc remelting installation as defined by claim 13 wherein there are six plasma arc torches radially arranged within said chamber above said mold and alternately connected to the secondary windings of two transformers and the neutral points of said two transformers being electrically connected and insulated from ground.

16. A plasma arc remelting installation as defined by claim 1 wherein said electric power supply source operates on direct current.

17. A plasma arc remelting installation for producing ingots comprising a hermetically sealable chamber; an ingot-forming mold contained in said chamber; a plurality of plasma arc torch means carried by said chamber and positioned above said mold; an electric power supply source connectable to said torch means so as to supply plasma to melt metal; a metal blank arranged to be melted in the plasma arc and the molten metal therefrom solidified in said mold; and a feeding mechanism for moving said metal blank into the plasma arcs, said feeding mechanism adapted to selectively rotate said blank axially with respect to the plasma arcs and move said blank in the direction of its axis.

18. A plasma arc remelting installation as defined by claim 17 wherein at least one of said torch means is adjustably mounted in said chamber to enable movement of the plasma arc therefrom with respect to said mold.

19. A plasma arc remelting installation as defined by claim 18 wherein said one plasma arc torch means is adjustable for movement along its axis and for variable axial positioning about a given fixed point on its axis.

20. A plasma arc remelting installation as defined by claim 17 wherein said feeding mechanism comprises a rod for attachment to said metal blank and a control mechanism adapted for feeding said rod axially downward and for selectively rotating said rod with respect to said plasma arc torch means.

21. A plasma arc remelting installation as defined by claim 17 wherein said feeding mechanism comprises a cable means for moving said blank in the direction of its axis and a rotation drive means for selectively rotating said blank axially with respect to the plasma arcs.

22. A plasma arc remelting installation as defined by claim 17 wherein said feeding mechanism comprises a train of spur gears, worm gears, and a control device.

23. A plasma arc remelting installation as defined by claim 17 wherein six plasma arc torch means are positioned above said mold, and wherein a carriage for supporting the ingot formed within said mold is provided, and further provided with an ingot extracting motor mechanism attached to said carriage, a system for evacuating said chamber and a system for recycling cleaned gas through said chamber, and a water cooling system for said torches, said mold, said sealable chamber.

24. A plasma arc remelting installation as defined by claim 17 wherein said electric power supply source, and said feeding mechanism are controlled by a remote control system which is physically removed from said sealable chamber.

25. A plasma arc remelting method for producing ingots comprising the steps of: suspending a metal blank within a hermetically sealable chamber from a feeding mechanism, removing the air in the chamber to create a vacuum in the order of $10^{-2}$ mmHg., scavaging the chamber with an inert gas, supplying electric power to a plurality of plasma arc torch means positioned above a mold contained in the chamber, melting liquid metal from the metal blank and solidifying the melted metal in the mold, rotating and feeding the metal blank axially downwardly as it is melted by the plasma arcs, simultaneously extracting from the mold the formed ingot while maintaining the liquid metal level at a constant position within the mold.

26. A plasma arc remelting method as defined by claim 25 comprising the additional step of adjusting the position of one or more of the plasma arc torch means with respect to the mold and the metal blank to allow even heat distribution and uniform melting of the metal blank and solidification of the ingot within the mold.

27. A plasma arc remelting method as defined by claim 25 comprising the preliminary steps of opening a side hatch in the hermetically sealable chamber, loading the metal blank into the chamber through the side hatch while in a vertical position, and extracting the spent metal blank stub through the same side hatch following the remelting operation.

28. A plasma arc remelting method as defined by claim 25 wherein flux is added to the mold during melting from a hermetically sealed hopper.

29. A plasma arc remelting method as defined by claim 25 wherein viewing ports located in the wall of the sealable chamber are cleaned of condensed materials during melting in order to provide viewing for adjustment of the plasma arc torch positions.

30. A plasma arc remelting method as defined by claim 25 wherein the heating of the molten metal pool contained within the mold by the plasma arcs generates free-convection macroflows resulting in stirring of the metallic bath, thereby promoting chemical homogenization of the molten metal and lower inclusion content in the ingot metal.

31. A plasma arc remelting method as defined by claim 25, wherein the molten metal melted by the plasma arcs is formed as a flat shallow bath within said mold having a maximum depth dimension to maximum cross sectional dimension of about 1/5 to 1/10.

32. A plasma arc remelting method as defined by claim 31, wherein the molten metal bath formed in said mold is maintained with a temperature gradient of up to about 200°C. per centimeter.

33. A plasma arc remelting method as defined by claim 25, wherein said plasma arc torch means are operated within an operating current range of about from 500 to 6000 amperes.

34. A plasma arc remelting method as defined by claim 25, wherein said plasma arc torch means are operated at potentials of about from 40 to 250 volts.

35. A plasma arc remelting method as defined by claim 25, wherein said plasma arc torch means are each operated at a power level of about from 150 to 3,000 kilowatts.

36. A plasma arc remelting method as defined by claim 25, wherein said method produces a plasma arc remelted ingot having low inclusion content and in a weight range of about from 50 kg. to 5,000 kg.

37. A plasma arc remelting method for producing ingots comprising the steps of: suspending a metal blank within a hermetically sealable chamber from a feeding mechanism, removing the air in the chamber to create a vacuum in the order of $10^{-2}$ mmHg., scavaging the chamber with an inert gas, supplying electric power to a plurality of plasma arc torch means positioned above a mold contained in the chamber, melting liquid metal from the metal blank and solidifying the melted metal in the mold, rotating and feeding the metal blank with a rotational oscillation about its vertical axis as it is melted by the plasma arcs, the oscillatory movement of the metal blank being over an angular increment equal to or greater than 360°/n, where n is the number of plasma arc torch means, and simultaneously extracting from the mold the formed ingot while maintaining the liquid metal level at a constant position within the mold.

* * * * *

UNITED STATES PATENT AND TRADEMARK OFFICE
CERTIFICATE OF CORRECTION

PATENT NO. : 3,894,573
DATED : July 15, 1975
INVENTOR(S) : Boris E. Paton et al

It is certified that error appears in the above–identified patent and that said Letters Patent are hereby corrected as shown below:

Column 7, line 14 & 15 delete "magnetic amplifier" and insert --device 136--.

Signed and Sealed this thirtieth Day of September 1975

[SEAL]

Attest:

RUTH C. MASON
*Attesting Officer*

C. MARSHALL DANN
*Commissioner of Patents and Trademarks*